US011953916B2

(12) United States Patent
Laughlin et al.

(10) Patent No.: US 11,953,916 B2
(45) Date of Patent: Apr. 9, 2024

(54) TRANSPORTATION POD THAT DEPLOYS FROM AN AIRCRAFT OR VEHICLE

(71) Applicant: The Boeing Company, Chicago, IL (US)

(72) Inventors: Brian Dale Laughlin, Wichita, KS (US); John William Glatfelter, Kennett Square, PA (US)

(73) Assignee: THE BOEING COMPANY, Arlington, VA (US)

( * ) Notice: Subject to any disclaimer, the term of this patent is extended or adjusted under 35 U.S.C. 154(b) by 909 days.

(21) Appl. No.: 16/778,409

(22) Filed: Jan. 31, 2020

(65) Prior Publication Data
US 2021/0240204 A1 Aug. 5, 2021

(51) Int. Cl.
| | | |
|---|---|---|
| G05D 1/04 | (2006.01) |
| B64D 5/00 | (2006.01) |
| B64D 9/00 | (2006.01) |
| B64D 17/34 | (2006.01) |
| B64D 17/80 | (2006.01) |

(Continued)

(52) U.S. Cl.
CPC ............... *G05D 1/042* (2013.01); *B64D 5/00* (2013.01); *B64D 9/00* (2013.01); *B64D 17/34* (2013.01); *B64D 17/80* (2013.01); *B64D 25/00* (2013.01); *B64F 5/60* (2017.01); *G05D 1/12* (2013.01)

(58) Field of Classification Search
CPC . G05D 1/042; G05D 1/12; B64D 5/00; B64D 9/00; B64D 17/34; B64D 17/80; B64D 25/00; B64D 1/08; B64D 25/12; B64F 5/60
See application file for complete search history.

(56) References Cited

U.S. PATENT DOCUMENTS 2,388,380 A * 11/1945 Bathurst ................... B64C 1/22
220/1.5
2,462,462 A 2/1949 Boggs et al.
(Continued)

FOREIGN PATENT DOCUMENTS

KR 102119424 B1 6/2020
RU 144783 U1 8/2014
(Continued)

OTHER PUBLICATIONS

Tucker, P., Why Your Plane Can't Have an Escape Pod, Defense One, Nov. 24, 2015, Retrieved from the internet: URL: https://www.defenseone.com/technology/2015/11/why-your-plane-cant-have-escape-pod/123989/ [retrieved on Jan. 31, 2020], pp. 1-5.
(Continued)

*Primary Examiner* — Donald J Wallace
*Assistant Examiner* — Jalal C Coduroglu
(74) *Attorney, Agent, or Firm* — COATS & BENNETT, PLLC

(57) ABSTRACT

Devices and methods of a pod that deploys from an aircraft or vehicle and descends to safely land. The pod is configured to be attached to an aircraft or vehicle. The pod includes walls that extend around and form a contained interior space that houses one or more travelers or cargo containers. During flight of the aircraft or vehicle, the pod deploys from the aircraft or vehicle while at an elevation above ground. A landing location is determined for the pod. While the pod is descending, the pod is steered towards and lands at the landing location.

20 Claims, 15 Drawing Sheets

(51) Int. Cl.
   *B64D 25/00*     (2006.01)
   *B64F 5/60*      (2017.01)
   *G05D 1/00*      (2006.01)
   *G05D 1/12*      (2006.01)

(56) References Cited

U.S. PATENT DOCUMENTS

| | | | |
|---|---|---|---|
| 2,562,491 A | 7/1951 | Hall | |
| 2,697,569 A * | 12/1954 | Westcott, Jr. | B64C 39/02 |
| | | | 244/137.1 |
| 3,067,973 A * | 12/1962 | Halsey | B64D 25/12 |
| | | | 244/140 |
| 3,101,919 A | 8/1963 | Madon | |
| 3,291,242 A | 12/1966 | Tinajero | |
| 3,423,121 A | 1/1969 | Lipkin | |
| 3,605,935 A | 9/1971 | Gilbert | |
| 3,767,253 A | 10/1973 | Kluetsch | |
| 4,143,841 A | 3/1979 | Roeder | |
| 4,358,072 A | 11/1982 | Williamson | |
| 4,664,340 A | 5/1987 | Jackson | |
| 4,676,545 A | 6/1987 | Bonfilio et al. | |
| 4,699,336 A | 10/1987 | Diamond | |
| 4,890,083 A | 12/1989 | Trenkler et al. | |
| 5,065,162 A | 11/1991 | Akaba et al. | |
| 5,356,097 A | 10/1994 | Chalupa | |
| 5,927,653 A * | 7/1999 | Mueller | B64G 5/00 |
| | | | 244/164 |
| 6,059,058 A | 5/2000 | Dower | |
| 6,382,563 B1 * | 5/2002 | Chiu | B64D 25/12 |
| | | | 244/140 |
| 6,392,538 B1 | 5/2002 | Shere | |
| 6,494,404 B1 | 12/2002 | Meyer | |
| 6,682,017 B1 * | 1/2004 | Giannakopoulos | G06F 9/06 |
| | | | 717/106 |
| 6,965,816 B2 * | 11/2005 | Walker | G08B 31/00 |
| | | | 701/16 |
| 7,344,109 B1 * | 3/2008 | Rezai | A62C 3/025 |
| | | | 169/72 |
| 7,946,530 B1 | 5/2011 | Talmage, Jr. | |
| 9,315,152 B1 | 4/2016 | Maestas et al. | |
| 9,322,897 B1 | 4/2016 | Hoffman et al. | |
| 10,207,805 B2 | 2/2019 | Evans | |
| 10,303,171 B1 * | 5/2019 | Brady | G05D 1/0202 |
| 10,545,509 B1 * | 1/2020 | Jessen | B62D 63/025 |
| 10,870,479 B2 | 12/2020 | Courtin | |
| 11,167,848 B2 | 11/2021 | Duffy et al. | |
| 11,180,253 B1 * | 11/2021 | Seeley | B64F 1/36 |
| 11,447,269 B2 * | 9/2022 | Seeley | B64F 1/31 |
| 11,548,335 B2 | 1/2023 | Stadler | |
| 2002/0172571 A1 | 11/2002 | Lawrence | |
| 2005/0139363 A1 * | 6/2005 | Thomas | A62C 3/025 |
| | | | 169/72 |
| 2005/0247824 A1 | 11/2005 | Allison, Sr. | |
| 2006/0079291 A1 | 4/2006 | Granovetter et al. | |
| 2006/0219846 A1 * | 10/2006 | Johnson | B64G 1/646 |
| | | | 244/158.9 |
| 2011/0233341 A1 * | 9/2011 | Monteforte | B64D 25/12 |
| | | | 244/140 |
| 2011/0265885 A1 * | 11/2011 | Singh | E21B 33/0385 |
| | | | 137/15.01 |
| 2013/0194089 A1 | 8/2013 | Estrada | |
| 2014/0160550 A1 | 6/2014 | Brown et al. | |
| 2014/0231593 A1 * | 8/2014 | Karem | B64C 39/10 |
| | | | 244/45 R |
| 2014/0302810 A1 | 10/2014 | Inha et al. | |
| 2015/0266666 A1 | 9/2015 | Wong | |
| 2015/0351686 A1 * | 12/2015 | Su | A61B 5/746 |
| | | | 600/595 |
| 2016/0059963 A1 * | 3/2016 | Burgess | B64D 1/12 |
| | | | 701/49 |
| 2017/0057645 A1 * | 3/2017 | Wang | B64C 39/024 |
| 2017/0124836 A1 | 5/2017 | Chung et al. | |
| 2017/0251096 A1 | 8/2017 | Koepke | |
| 2017/0361795 A1 | 12/2017 | Del-Fabbro et al. | |
| 2018/0002027 A1 * | 1/2018 | McCullough | B64C 29/02 |
| 2018/0086353 A1 | 3/2018 | Holbrooke et al. | |
| 2018/0126871 A1 | 5/2018 | Martinotti et al. | |
| 2018/0170558 A1 * | 6/2018 | Sapija | B64D 45/00 |
| 2018/0354617 A1 * | 12/2018 | Frolov | B60F 5/02 |
| 2019/0106021 A1 | 4/2019 | Dietrich et al. | |
| 2019/0176983 A1 * | 6/2019 | Darnell | B64C 25/52 |
| 2019/0271988 A1 | 9/2019 | High et al. | |
| 2019/0276129 A1 * | 9/2019 | Morgan | B64D 17/72 |
| 2019/0352004 A9 * | 11/2019 | Frolov | B64C 29/0025 |
| 2019/0375505 A1 * | 12/2019 | Bluvband | A61N 1/3993 |
| 2020/0047692 A1 | 2/2020 | Park et al. | |
| 2020/0198809 A1 * | 6/2020 | Holder | B64F 1/10 |
| 2020/0398730 A1 * | 12/2020 | Glatfelter | B60P 3/32 |
| 2020/0398731 A1 * | 12/2020 | Glatfelter | B64D 9/00 |
| 2020/0398732 A1 * | 12/2020 | Glatfelter | B64D 11/00 |
| 2020/0400437 A1 * | 12/2020 | Glatfelter | G05D 1/0202 |
| 2021/0039766 A1 | 2/2021 | Nazhand | |
| 2021/0094692 A1 * | 4/2021 | Driscoll | B64D 17/72 |
| 2021/0183214 A1 | 6/2021 | Attariani et al. | |

FOREIGN PATENT DOCUMENTS

| | | | | |
|---|---|---|---|---|
| RU | | 2706748 C1 | 11/2019 | |
| UA | | 88319 U | 3/2014 | |
| WO | WO-2020176415 A1 * | | 9/2020 | B64D 17/10 |

OTHER PUBLICATIONS

Star Wars, Escape Pod, Retrieved from the internet: URL: https://www.starwars.com/databank/escape-pod [retrieved on Jan. 31, 2020], pp. 1-4.

Tablang, K., "This Intriguing Aircraft Concept Aims to Eliminate Airport Lines and Terminals", ForbesLife, Retrieved from the internet: URL:https://www.forbes.com/sites/kristintablang/2016/07/12/clip-air-concept-ecole-polytechnique-federale-de-lausanne-switzerland/?sh=7421b65a2283 [retrieved on Jun. 17, 2022], Jul. 12, 2016, pp. 1-6.

* cited by examiner

TRANSPORTATION POD THAT DEPLOYS FROM AN AIRCRAFT OR VEHICLE

TECHNOLOGICAL FIELD

The present disclosure relates generally to the field of transporting one or more of cargo containers and travelers and, more specifically, to the use of pods for the transportation and features of the pods that provide for safe landing of the pods during an event.

BACKGROUND

Much of a traveler's time is spent moving from one environment to another. For example, a business traveler that travels from their office to a business meeting in a remote city moves through a number of different environments. This can initially include riding in a first vehicle such as a car or public transportation vehicle to travel from their office to the airport. This can also include moving within the interior of the airport while going through security and waiting at the airline gate. Another environment includes the one or more aircraft or vehicle used for traveling to the city where the meeting is located. This can then also include another transportation vehicle to travel from the airport to the meeting.

The traveler is required to physically move into and out of each of these environments during their trip. This includes getting into an out of vehicles, sitting in waiting areas, sitting on the aircraft or vehicle, moving through security, etc. Further, the traveler is required to closely monitor the time to ensure they are at the correct location at the correct time. This movement and monitoring of time makes it difficult for the traveler to be productive. Further, the required effort can be exhausting to the traveler.

Likewise, cargo containers are often packed and then subsequently repacked multiple times during shipment. For example, a container can be initially packed onto a first vehicle, shipped to a first location, unpacked from the first vehicle at the first location, repacked onto a second vehicle at the first location, and then shipped to a second location. This process continues until the cargo containers are transported to its ultimate destination.

SUMMARY

One aspect is directed to a method of operating a pod that is attached to an aircraft or vehicle. The method comprises: during flight of the aircraft or vehicle, deploying the pod from the aircraft or vehicle while at an elevation above ground with the pod comprising walls that extend around and form a contained interior space that houses one or more travelers or cargo containers; determining a landing location for the pod to safely land; while the pod is descending from the elevation, steering the pod towards the landing location; and landing the pod at the landing location.

In another aspect, the method comprises determining a condition of the one or more of the travelers or cargo containers based on signals received from personal electronic devices that are on the one or more travelers or cargo containers.

In another aspect, the method comprises sensing a condition of the one or more travelers or cargo containers after deploying the pod from the aircraft or vehicle based on a motion sensor located within the interior space.

In another aspect, deploying the pod from the aircraft or vehicle comprises that while the pod is within the aircraft or vehicle releasing a canopy that is attached to the pod and causing the canopy to pull the pod out of the aircraft or vehicle.

In another aspect, steering the pod towards the landing location comprises receiving inputs from controls located within the contained interior space and adjusting one or more lines that are attached to the canopy.

In another aspect, the method comprises receiving inputs from one or more sensors on the pod and automatically adjusting a canopy on the pod during descent of the pod.

In another aspect, the method comprises removing one or more sections of the aircraft or vehicle prior to deploying the pod from the aircraft or vehicle to prevent damage to the pod.

In another aspect, the method comprises determining the landing location after deploying the pod from the aircraft or vehicle.

In another aspect, determining the landing location comprises calculating a glide path of the pod and selecting the landing location from a plurality of landing options within the glide path.

In another aspect, the method comprises continuously monitoring a geographic location of the pod during the flight.

In another aspect, landing the pod at the landing location comprises deploying airbags that are mounted on the pod and that inflate on an exterior of the pod prior to landing the pod at the landing location.

In another aspect, the method comprises after landing at the landing location, transmitting from the pod a geographic location of the pod, an orientation of the pod, and a physical condition of the pod.

One aspect is directed to a method of operating a pod that is attached to an aircraft or vehicle. The method comprises: determining an occurrence of an event with the aircraft or vehicle during flight and while the aircraft or vehicle is at an elevation and while the pod is being carried by the aircraft or vehicle with the pod comprising a contained interior space that houses one or more travelers or cargo containers; deploying the pod from the aircraft or vehicle during the flight and after the occurrence of the event; calculating a plurality of landing locations that are located within a predetermined range of the event; steering the pod towards one of the landing locations while the pod is descending from the elevation; and landing the pod at the one landing location.

In another aspect, the method comprises calculating a glide path of the pod and calculating the plurality of landing locations that are located within the glide path.

In another aspect, the method comprises receiving at least one of the elevation and speed of the aircraft or vehicle from the aircraft or vehicle prior to deploying the pod from the aircraft or vehicle and calculating a glide path of the pod based on at least one of the elevation and the speed.

In another aspect, the method comprises sensing conditions within the interior space after landing the pod at the one landing location and determining a condition of the one or more travelers or cargo containers based on the conditions.

One aspect is directed to a pod configured to be connected to and transported by an aircraft or vehicle. The pod comprises a plurality of walls that extend around and form an interior space. A canopy is attached to one or more of the walls with the canopy adjustable between a stowed orientation when the pod is being transported by the aircraft or vehicle and a deployed orientation. One or more steering lines extend between the pod and the canopy to adjust the canopy and steer the pod during descent. A control unit is configured to: deploy the canopy from the stowed orientation to the deployed orientation; calculate a glide path of the pod; calculate one or more landing locations that are located within the glide path; and adjust the one or more steering lines and steer the pod towards one or more of the landing locations while the pod is descending.

In another aspect, one or more sensors on the pod detect one or more environmental conditions after the pod is deployed from the aircraft or vehicle and the control unit receives signals from the one or more sensors to calculate the one or more landing locations.

In another aspect, a wireless communication circuit transmits a location of the pod during descent of the pod.

In another aspect, one or more sensors receive signals from personal electronic equipment from the one or more travelers or cargo containers with a control unit configured to determine a health of the one or more travelers or cargo containers based on the signals.

The features, functions and advantages that have been discussed can be achieved independently in various aspects or may be combined in yet other aspects, further details of which can be seen with reference to the following description and the drawings.

DETAILED DESCRIPTION

Figure 1:
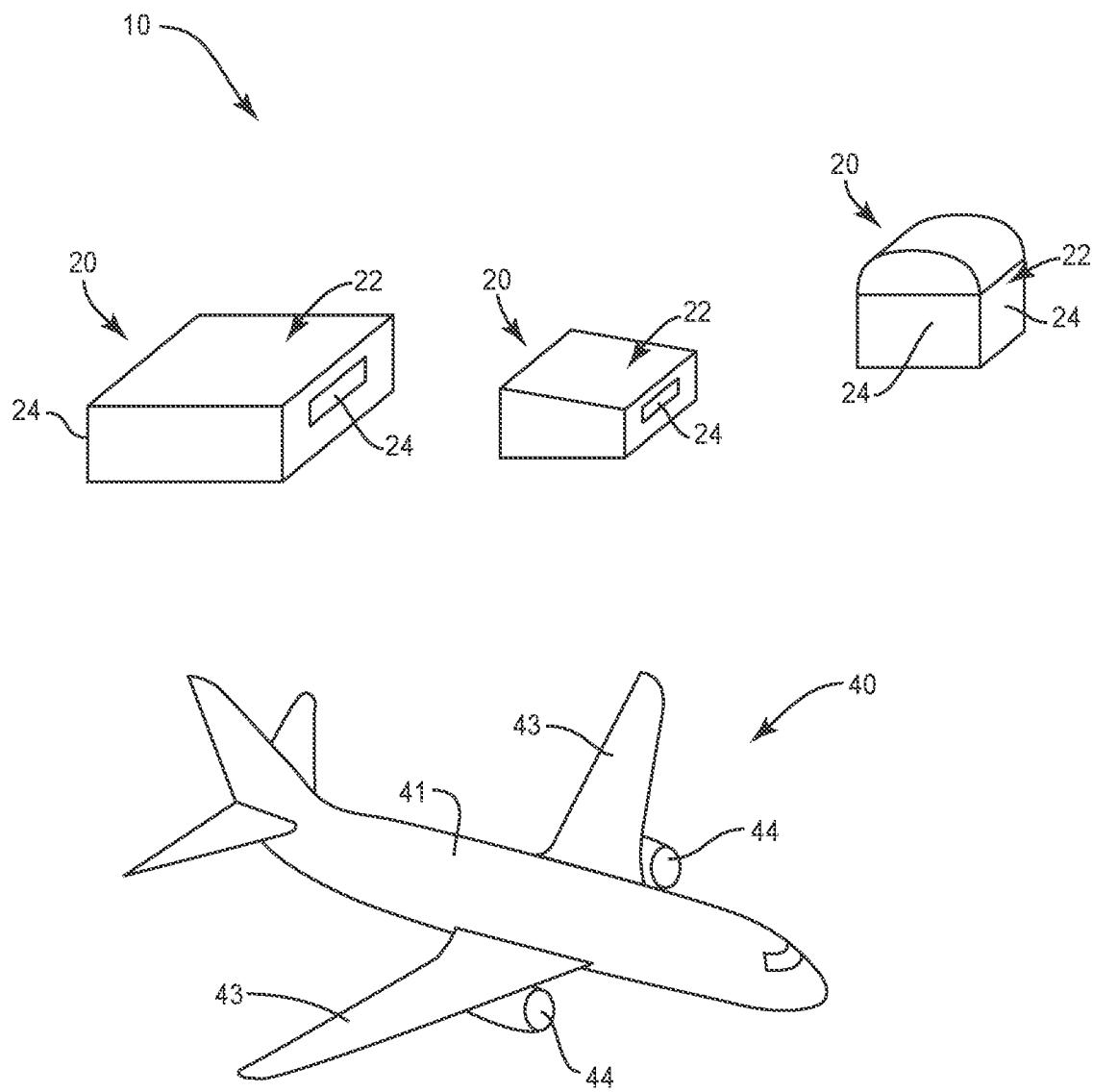
FIG. 1 is schematic diagram of pods that can be attached to an aircraft or vehicle.

FIG. 1 illustrates a transportation system 10 that includes one or more pods 20. The pods 20 include wall segments 24 that extend around and form an interior space 22 configured to house one or more travelers and/or cargo. The pods 20 are attached to and transported by a variety of different aircraft or vehicle 40. During use, one or more travelers and/or objects are housed within the pod 20. The pods 20 are connected to and transported by the aircraft or vehicle 40.

Figure 2:
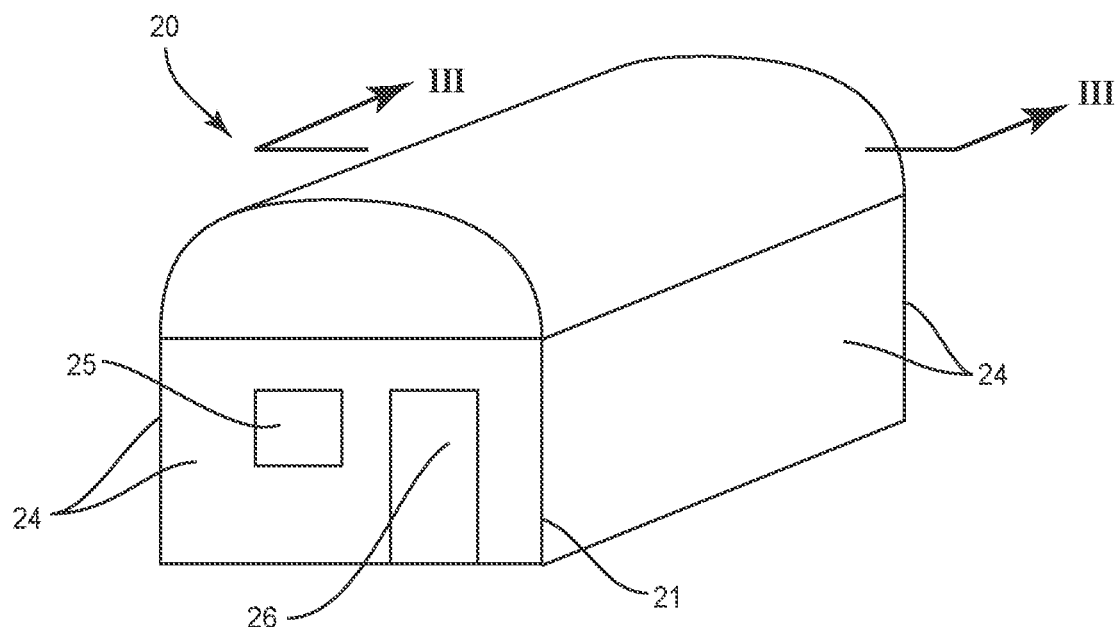
FIG. 2 is perspective view of a pod.

FIG. 2 illustrates a pod 20 that includes a frame 21 with one or more wall segments 24 that can be configured in various shapes and sizes. One or more of the wall segments 24 can be opaque to provide for privacy within the interior space 22. One or more of the wall segments 24 can be translucent to allow light from the exterior to enter into the interior space 22. One or more windows 25 can extend through one or more of the wall segments 24 to allow the travelers to view their environment during travel. One or more doors 26 provide for access into and out of the interior space 22.

Figure 3:
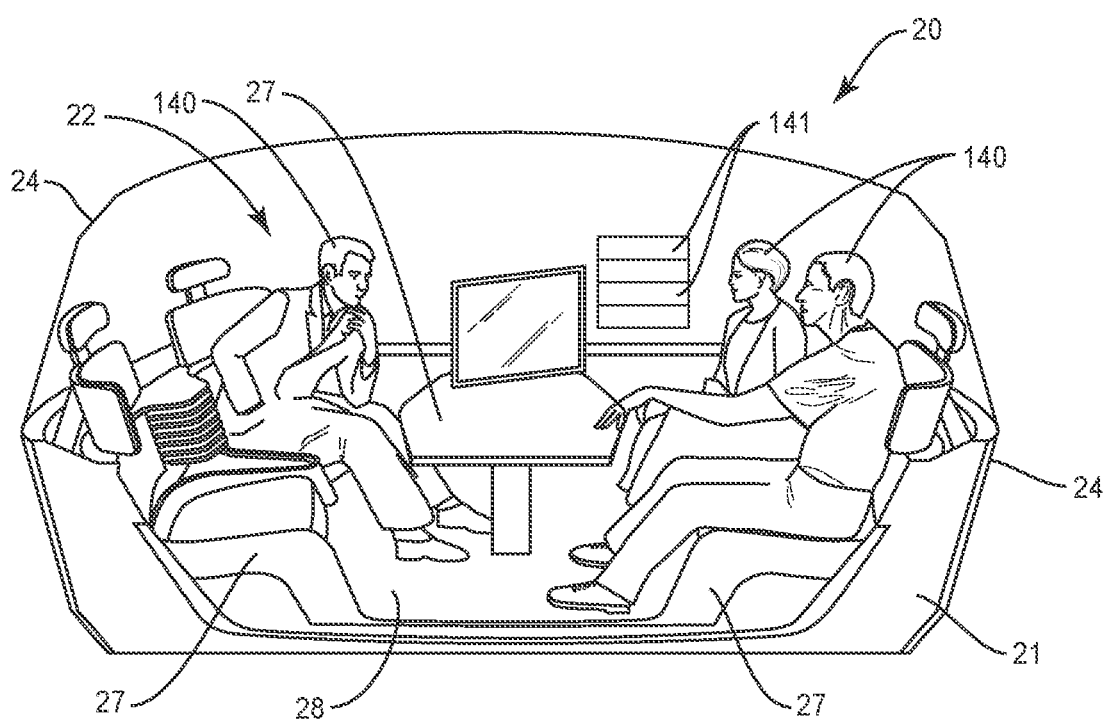
FIG. 3 is a section view of the pod of FIG. 3 cut along line III-III.

FIG. 3 illustrates an interior space 22 configured as a meeting space. Furniture 27 such as chairs, tables, bookshelves, cabinets, and couches are positioned to facilitate the meeting. In one example, one or more of the pieces of furniture 27 are secured to the floor 28. This provides for the furniture pieces 27 to remain upright during movement of the pod 20. This movement can be caused by various forces, such as but not limited to turbulence during flight, and attachment and detachment of the pod 20 with the aircraft or vehicle 40. In one example, one or more of the furniture pieces 27 remain unattached and are freely movable by the travelers around the interior space 22. The interior space 22 is configured to transport one or more travelers 140 and/or cargo containers 141. In one example, the cargo containers 141 are stored in shelves.

The interior space 22 is designed to facilitate the needs of the traveler 140 during travel. This can include but is not limited the interior space 22 configured as a meeting space during business travel, a bedroom for overnight travel, various general seating arrangements for business and social travel, as an office with one or more desks, a theater arrangement to watch movies during travel, and various other arrangements.

The interior space 22 can also be designed to facilitate the transportation of cargo containers 141. Various shelving, attachment points, etc. can be located to secure cargo. Further, the interior space 22 can be temperature controlled. In one example, the interior space 22 is designed to concurrently transport travelers 140 and cargo containers 141. One or more sections can be designed to accommodate travelers 140, and one or more sections are designed to accommodate cargo containers 141. In one specific example, the interior space 22 is divided into a first section for cargo containers 141 and a second section for travelers 140.

Figure 4:
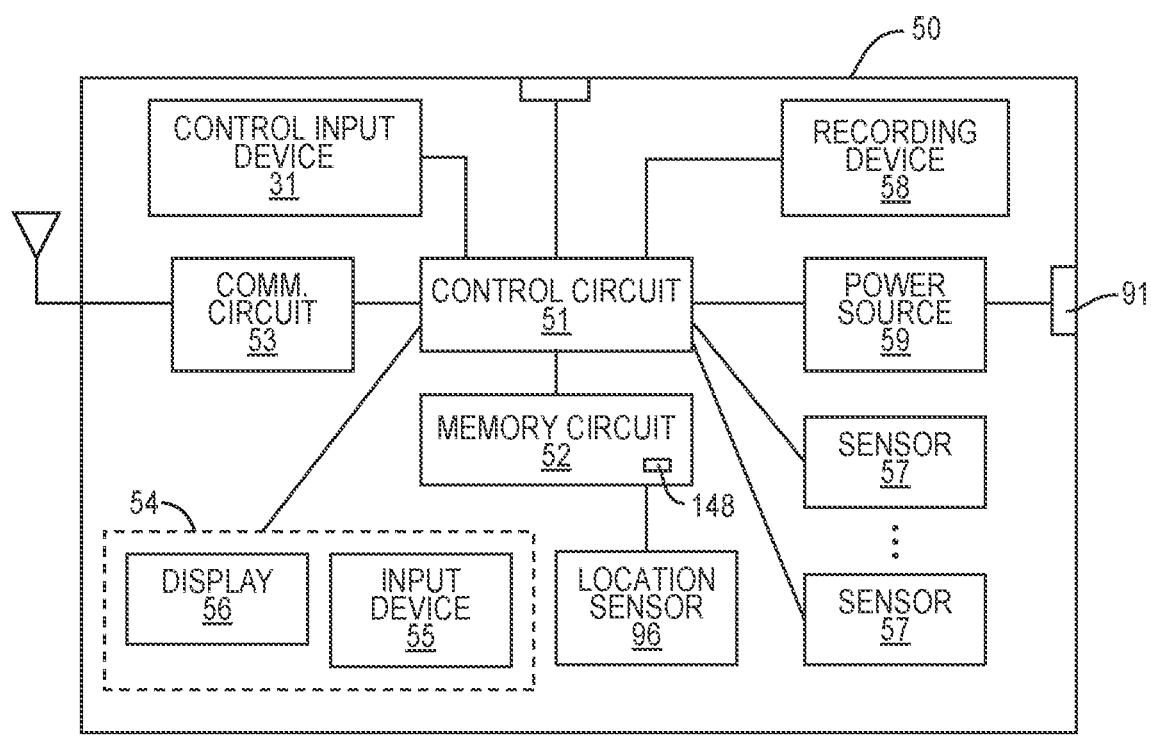
FIG. 4 is a schematic diagram of a control unit of a pod.

The pod 20 includes a control unit 50 as illustrated in FIG. 4. The control unit 50 includes a control circuit 51 and a memory circuit 52. The control circuit 51 controls overall operation of the pod 20 according to program instructions 148 stored in the memory circuit 52. The control circuit 51 can include one or more circuits, microcontrollers, microprocessors, hardware, or a combination thereof. Memory circuit 52 includes a non-transitory computer readable storage medium storing program instructions 148, such as a computer program product, that configures the control circuit 51 to implement one or more of the techniques discussed herein. Memory circuit 52 can include various memory devices such as, for example, read-only memory, and flash memory. Memory circuit 52 can be a separate component as illustrated in FIG. 4, or can be incorporated with the control circuit 51. Alternatively, the control circuit 51 can omit the memory circuit 52, e.g., according to at least some embodiments in which the control circuit 101 is dedicated and non-programmable.

The control unit 50 is configured to provide for communication functionality for the travelers 140 in the pod 20. Communications can include both incoming and outgoing communications. A communications circuit 53 provides for this communication functionality. The communications circuit 53 enables communication between devices used by the travelers 140 and remote entities over a communication network. The communications circuit 53 can also include one or more devices mounted in the interior space 22 that provide for communications with the remote entities.

The communications circuit 53 can include one or more interfaces that provide for different methods of communication. The communications circuit 53 can include a cellular interface that enables communication with a mobile communication network (e.g., a WCDMA, LTE, or WiMAX network). The communication circuit 53 can include a WLAN interface configured to communicate with a local area network, e.g., via a wireless access point. An exemplary WLAN interface could operate according to the 802.11 family of standards, which is commonly known as a WiFi interface. The communication circuit 53 can further include a personal area network interface, such as a Bluetooth interface. The communication circuit 53 can also include a Near Field Communication interface that provides for short-range wireless connectivity technology that uses magnetic field induction to permit devices to share information with each other over short distances.

In one example as illustrated in FIG. 4, the communications circuit 53 is incorporated into the control unit 50. In another example, the communications circuit 53 is a separate system that is operatively connected to and controlled by the control unit 50.

A user interface 54 provides for a traveler 140 in the pod 20 to control one or more aspects of the pod 20. The user interface 54 can include one or more input devices 55 such as but not limited to a keypad, touchpad, roller ball, and joystick. The one or more input devices 55 provide for the traveler 140 to enter commands to the control circuit 51. The user interface 54 can also include one or more displays 56 for displaying information to the traveler 140. The user interface 54 can also include a communication device that provides for communicating with the remote entities.

One or more sensors 57 detect different aspects of the pod 20. The data from the one or more sensors 57 can be stored in the memory circuit 52. One or more sensors 57 detect the physical condition of the pod 20 such as but not limited to a temperature within the interior space 22, the position of a door 26 of the pod 20 (i.e., open or closed), an orientation of the pod 20, whether the pod 20 is in water, and whether the pod 20 is connected to the aircraft or vehicle 40. One or more sensors 57 can detect structural aspects of the pod 20 and forces exerted on the pod 20 and can include but are not limited to one or more strain gauges and pressure sensors. One or more of the sensors 57 can also detect the condition of the travelers 140 within the interior space 22. Examples include but are not limited to motion sensors 57 to detect the movement of the travelers 140, and $CO_2$ sensors to detect carbon dioxide in the interior space 22 to determine the extent of breathing by the travelers 140.

Another sensor 57 can receive signals from electronic equipment that is worn by the travelers 140. For example, sensors 57 can receive signals from a monitoring device that is worn by a traveler (e.g., FITBIT monitor, APPLE watch, GARMIN fitness tracker) that monitors one or more physical aspects of the traveler (e.g., heartbeat, blood pressure, step count).

One or more sensors 57 can detect conditions during a descent of the pod 20 from the aircraft or vehicle 40. Examples include but are not limited to airspeed, orientation (e.g., pitch, roll, yawl), and altitude. One or more recording devices 58 can record video and/or audio from within the interior space 22 and/or the space around the exterior of the pod 20.

A location sensor 96 detects the geographic location of the pod 20. Location sensor 96 can include a global positioning system (GPS) component that receives coordinate information from various sources (e.g., satellites, base stations) to determine a geographic position of the pod 20.

A power source 59 provides power to the control unit 50. The power source 59 can include various configurations, including but not limited to batteries. The power source 59 can also provide power to various components that are within the interior space 22, such as a television and lights. One or more solar panels can be mounted on the exterior of the pod 20 and provide recharging to the power source 59. The power source 59 can include a connector 91 to provide a hardwire connection to an external power source (e.g., electrical power from the aircraft or vehicle 40). FIG. 4 includes the power source 59 incorporated with the control unit 50. In another example, the power source 59 can be separate from the control unit 50 and configured to provide power to the control unit 50.

The control circuit 51 can further function as an on-board flight computer utilizing GPS, accelerometers 57, and communication links to satellites 76 to determine the geographic location of the pod 20 in real time. This acting on-board flight computer can also determine various aspects, such as but not limited to rate of descent, direction, speed and direction of movement, and glide path.

One or more control devices 31 provide for controlling the pod 20 during a descent from the aircraft or vehicle 40. Control devices 31 can include but are not limited to a keypad, touchpad, roller ball, and joystick. The control devices 31 provide for a traveler 140 within the interior space 22 to control the descent to a landing zone.

Figure 5:
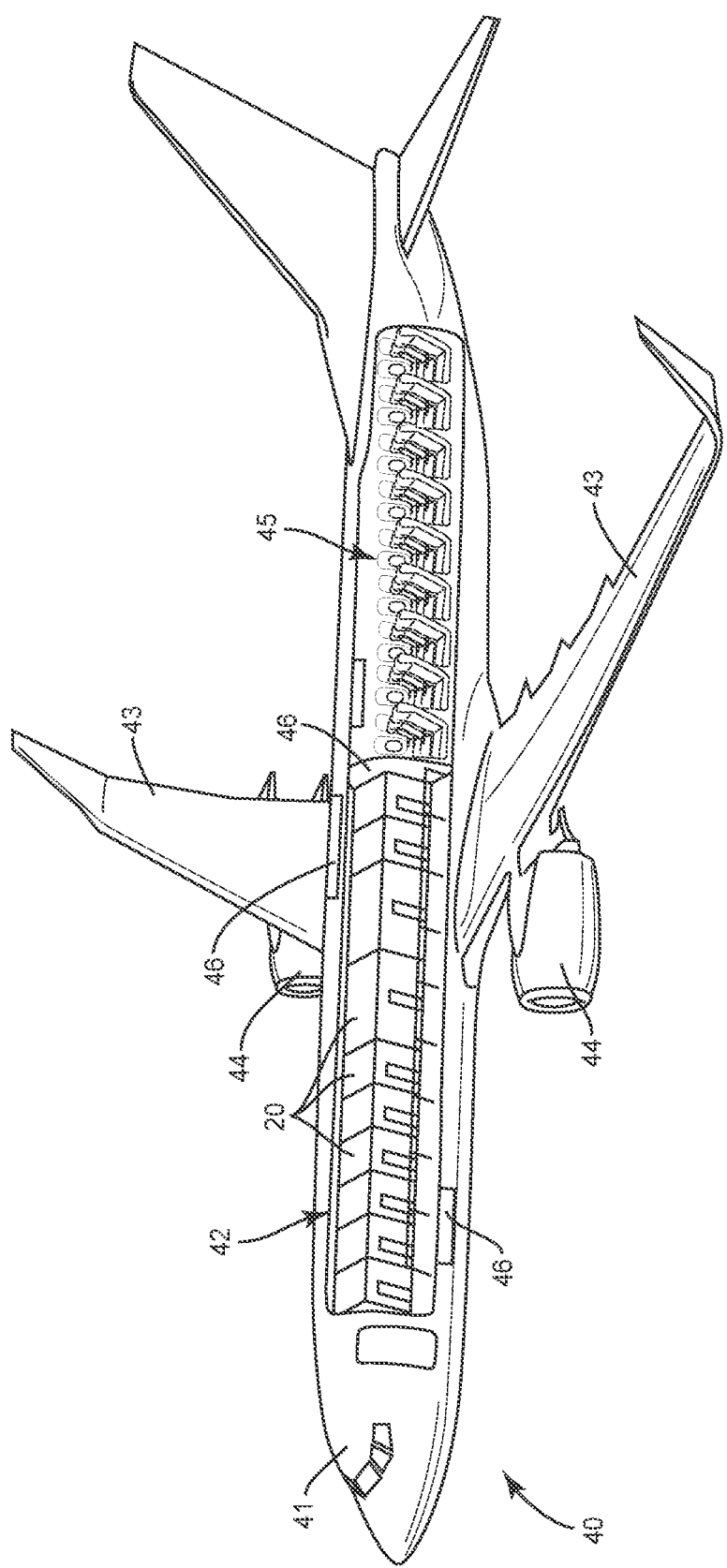
FIG. 5 is a schematic cut-away view of pods positioned within an interior space of an aircraft or vehicle.

FIG. 5 illustrates a number of pods 20 being transported by an aircraft or vehicle 40. The aircraft or vehicle 40 includes wings 43 with one or more engines 44 equipped for flight and a fuselage 41 with an interior space 42 sized to contain the pods 20. The interior space 42 that contains the pods 20 is pressurized to allow travelers 140 to exit the pod 20 during flight (such as to use restrooms or a lounge). The vehicle 40 can also include a cabin area 45 with one or more seats for transporting persons. The cabin area 45 can also include one or more lavatories and a galley. The area that contains the pods 20 can be separated from the cabin area 45 by a wall. The relative sizes of the section that contains the pods 20 and the cabin area 45 can vary. FIG. 5 includes an example in which each occupies roughly one-half of the area of the interior space 42 of the aircraft or vehicle 40. Other examples can include the sections having various relative dimensions. In one example, the aircraft or vehicle 40 is sized to hold a single pod 20.

One or more doors 46 access the interior space 42 for loading and unloading the pods 20. The doors 46 can be positioned along one or more different sections of the fuselage 41. The doors 46 can include the same or different shapes and/or sizes and/or configurations. In one example, one or more of the doors 46 are emergency doors 46 for opening if an event were to occur during a flight. One or more of the emergency doors 46 can be opened in various manners, including through the control units 50 of the pods 20, and through controls in the cockpit of the aircraft or vehicle 40.

Figure 6:
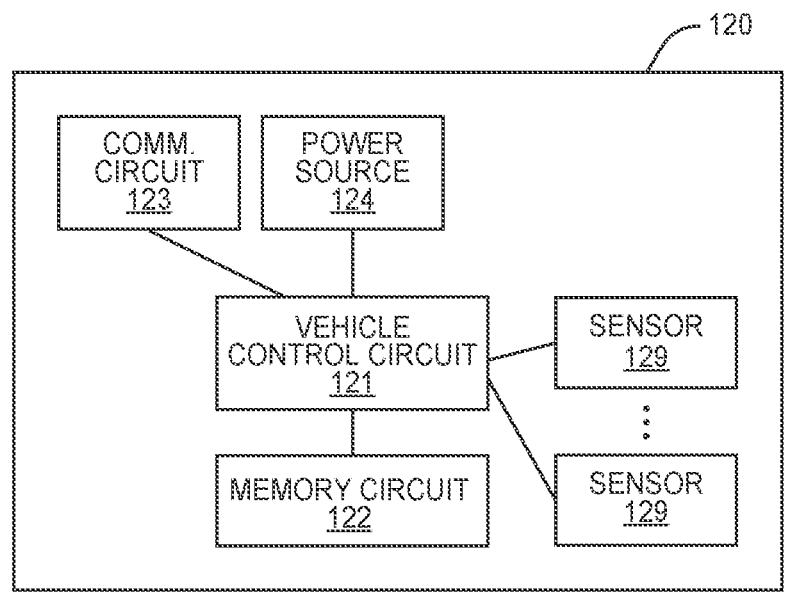
FIG. 6 is a schematic diagram of a control unit of an aircraft or vehicle.

As illustrated in FIG. 6, an aircraft or vehicle control unit 120 controls one or more operations of the aircraft or vehicle 40. In one example, the control unit 120 is a flight control unit that controls the operation of the aircraft or vehicle 40. The control unit 120 includes a control circuit 121 and a memory circuit 122. The control circuit 121 controls one or more operations of the vehicle 40 according to program instructions stored in the memory circuit 122. The control circuit 101 can include one or more circuits, microcontrollers, microprocessors, hardware, or a combination thereof. Memory circuit 122 includes a non-transitory computer readable storage medium storing program instructions, such as a computer program product, that configures the control circuit 121 to implement one or more of the techniques discussed herein. Memory circuit 122 can include various memory devices such as, for example, read-only memory, and flash memory. Memory circuit 122 can be a separate component, or can be incorporated with the control circuit 121.

A communications circuit 123 provides for communication functionality for the aircraft or vehicle 40. The communications circuit 123 can provide for different methods of communication, and can include one or more of a cellular interface that enables communication with a mobile communication network, and a WLAN interface configured to communicate with a local area network. In one example, the communications circuit 123 is incorporated into the control unit 120. In another example, the communications circuit 123 is a separate system that is operatively controlled by the control circuit 121. The communication circuit 123 can further include a personal area network interface, such as a Bluetooth interface, and a Near Field Communication interface that provides for short-range wireless connectivity technology that uses magnetic field induction to permit devices to share information with each other over short distances.

One or more sensors 129 provide for detecting one or more conditions with the aircraft or vehicle 40. Conditions include but are not limited to temperature within the aircraft or vehicle 40, smoke within the aircraft or vehicle 40, operational aspects of the engines 44, geographic location, and altitude. A power source 124 provides power to the control unit 120 as well as components within the aircraft or vehicle 40. The power source 124 can include various configurations, including but not limited to batteries.

The pod 20 can function as an independent unit when unattached from an aircraft or vehicle 40 as well as when attached to an aircraft or vehicle 40. This independence includes the control unit 50 providing the needed functionality to support the travelers 140 and/or cargo containers 141. For example, the control unit 50 can provide for communications to and from the pod 20 through the communications circuit 53. The power source 59 can provide electrical power to the components within the interior space 22, including both these that are part of the pod 20 (e.g., lights, video equipment) and those brought into the interior space 22 by the traveler 140 (e.g., cellphone, laptop computer). The control unit 50 can also provide control of the interior temperature.

Figure 7:
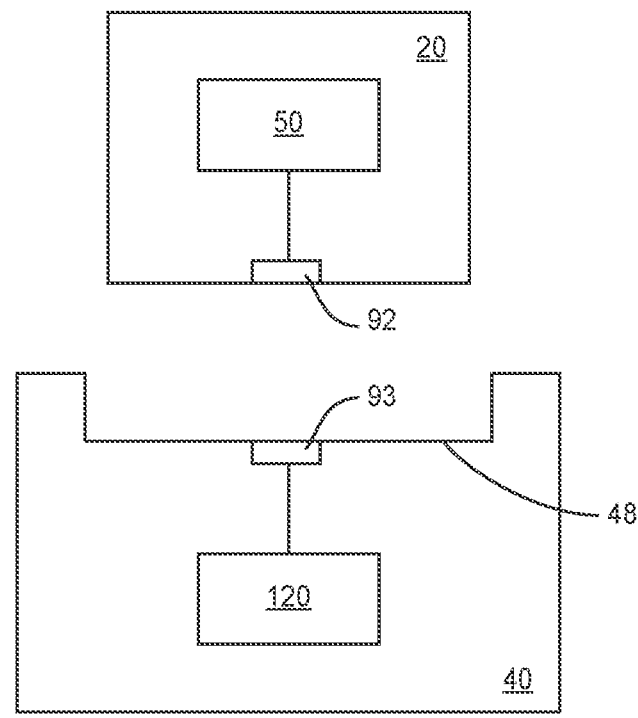
FIG. 7 is a schematic diagram of a pod being connected to an aircraft or vehicle.

The pod 20 can further be configured to receive one or more of the utility functions from the aircraft or vehicle 40 when attached to the aircraft or vehicle 40. FIG. 7 illustrates a manner by which the pod 20 can connect to and receive one or more of the utility functions from the aircraft or vehicle 40. The pod 20 includes a port 92 that is connected to the pod control unit 50. Likewise, the aircraft or vehicle 40 includes a port 93 that is connected to the aircraft or vehicle control unit 120. When the pod 20 is connected to the aircraft or vehicle 40, the ports 92, 93 engage together to provide for one or more of the utility functions to be supplied from the aircraft or vehicle 40 to the pod 20.

Figure 8:
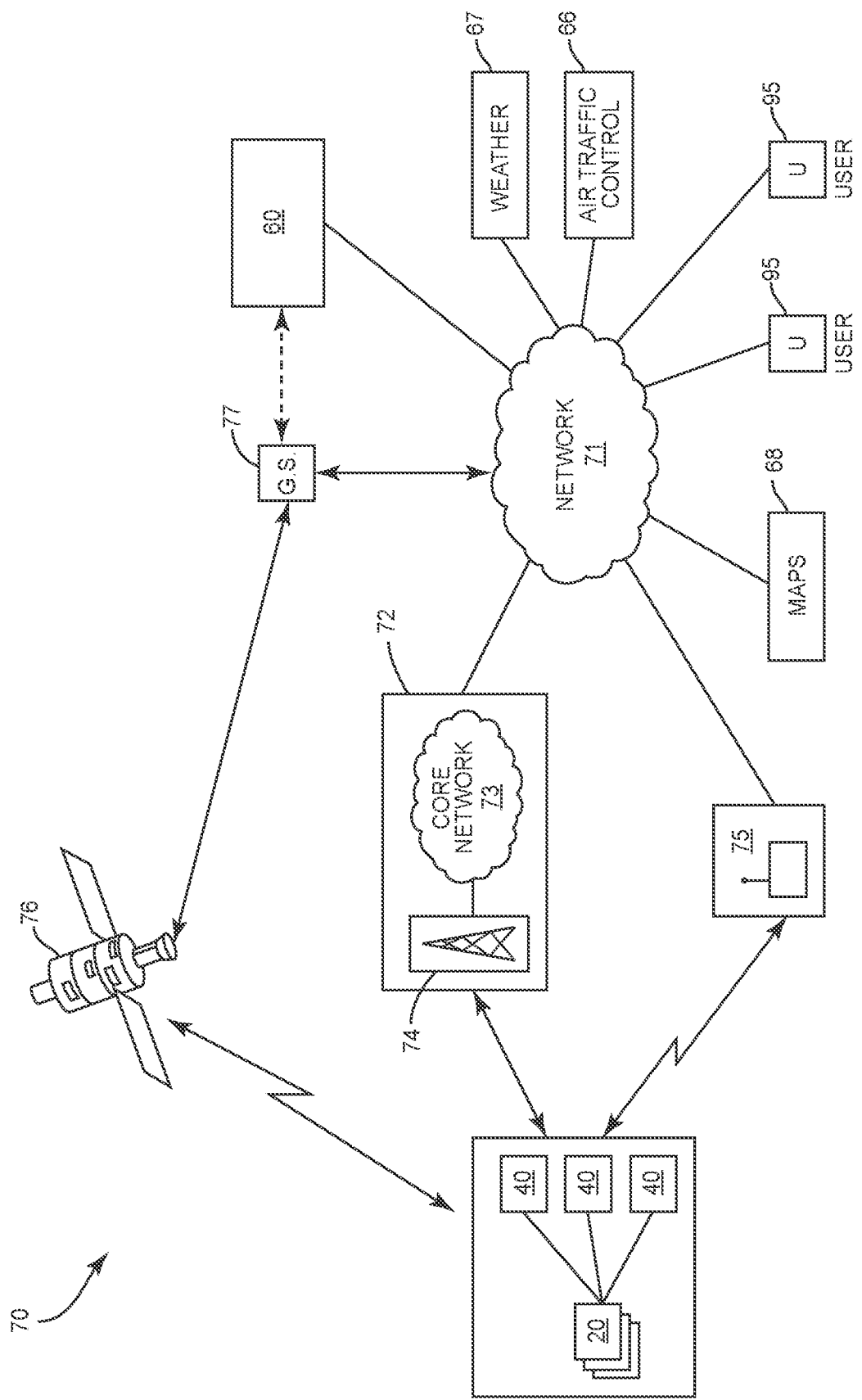
FIG. 8 is a schematic diagram of a wireless communication network.

As illustrated in FIG. 8, a remote server 60 monitors the pod 20. The remote server 60 monitors the pod 20 while it is connected to the aircraft or vehicle 40, as well as when disconnected from the aircraft or vehicle 40. The remote server 60 monitors and communicates with the pod 20 and aircraft or vehicle 40 through a wireless communications network 70. The communications circuits 53, 123 of the pods 20 and vehicles 40 respectively enable communication with the server 60 through the wireless communications network 70.

The wireless communication network 70 can includes a packet data network (PDN) 71. The PDN 71 can include a public network such as the Internet, or a private network. The wireless communications network 70 can include a mobile communication network 72 (e.g., a WCDMA, LTE, or WiMAX network). The mobile communication network (MCN) 72 includes a core network 73 and a radio access network (RAN) 74 including one or more base stations. The MCN 72 can be a conventional cellular network operating according to any communication standards now known or later developed. For example, the MCN 72 can comprise a Wideband Code Division Multiple Access (WCDMA) network, a Long Term Evolution (LTE) network, or WiMAX network. The MCN 72 is further configured to access the packet data network (PDN) 71.

The communications circuits 53, 123 can also communicate through a Wireless Local Area Network (WLAN) 75 that operates according to the 802.11 family of standards, which is commonly known as a WiFi interface.

Communications can also be available through one or more satellites 76. The satellites 76 can communicate to the server 60 through one or more of ground stations 77. The ground stations 77 can communicate to the server 60 through the PDN 71, or without use of the PDN 71.

Figure 9:
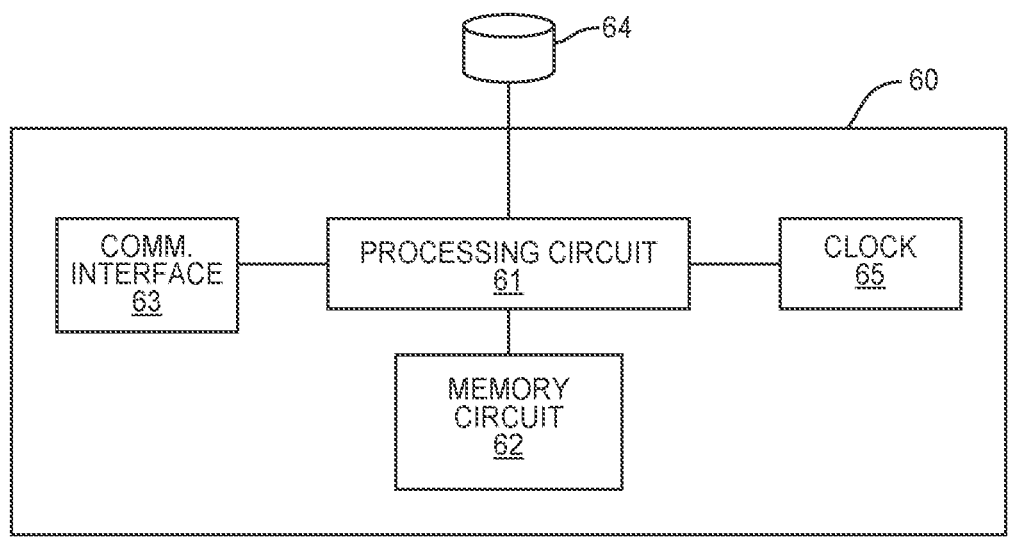
FIG. 9 is a schematic diagram of a server.

As illustrated in FIG. 9, the server 60 includes one or more processing circuits (illustrated as processing circuit 61) that may include one or more microprocessors, microcontrollers, Application Specific Integrated Circuits (ASICs), or the like, configured with appropriate software and/or firmware. A computer readable storage medium (shown as memory circuit 62) stores data and computer readable program code that configures the processing circuit 61 to implement the techniques described above. Memory circuit 62 is a non-transitory computer readable medium, and may include various memory devices such as random access memory, read-only memory, and flash memory. A communications circuit 63 connects the server 60 to the PDN 71, and can be configured to communicate with the PDN 71 according to one or more 802.11 standards. The communications circuit 63 can support a wired connection (e.g., Ethernet), a wireless connection, or both. A database 64 stores information about the travelers 140, cargo containers 141, pods 20, and aircraft or vehicle 40. The database 64 is stored in a non-transitory computer readable storage medium (e.g., an electronic, magnetic, optical, electromagnetic, or semiconductor system-based storage device). The database 64 can be local or remote relative to the server 60. A clock 65 can measure various timing requirements regarding the transportation of the pods 20. The clock 65 can be incorporated with the processing circuit 61, or can be a separate component independent from the processing circuit 61.

The server 60 can be configured to provide a web interface for access by one or more entities. The server 60 is configured for accessing information about the pods 20, travelers 140, and cargo containers 141 using a browser-based interface or an applications program interface (API). The browser-based interface can include a website through which the contents of the database 64 can be accessible. Although the website can be hosted by the server 60, it can also be hosted at another location accessible through the PDN 71.

The server 60 stores the information about the pods 20, travelers 140, and cargo containers 141. This information can be stored at the database 64 that can be located at the server 60 and/or can be stored at a remote location. Entities can access the information at the server 60 through a variety of devices 95. The devices 95 can include laptop computers, personal computers, personal digital assistants, mobile computing/communication, tablet devices, and various other-like computing devices. Each of the entities uses a respective device 95 and accesses the server 60 through the PDN 71, or alternatively some other network. In one embodiment, one or more of the entities can use his or her respective device 95 to access the server 60 through a separate portal. Each entity's portal can include a secure interface through which the entity can access the information that is assigned to them.

A variety of different entities through their devices 95 can have access to some or all of the information at the server 60. The entities can include travelers 140, owners of cargo containers 141 that are being transported, and various emergency personnel (e.g., police, firefighters, coast guard) responding to a recovery operation for the pods 20. Entities can also include family members, friends, and business associates that are associated with the travelers 140 and/or cargo containers 141 and desire to track the status of the transportation.

The entities can access the information by accessing the server 60. In one example, the server 60 is configured for browser-based accessibility. The browser-based interface can support well-known browsers such as Internet Explorer and Mozilla Firefox, Safari, Chrome. Alternatively, or in conjunction the entities can obtain the information using one or more APIs through their device 95.

Prior to traveling on a pod 20, information about the traveler 140 and cargo container 141 is entered into a record that is maintained at the database 64. For a traveler 140, the information can include but is not limited to name, address, age, emergency contact, health issues, etc. Likewise, information about the cargo containers 141 is also entered such as but not limited to identification of the cargo, weight, fire classification (e.g., flammable, combustible), and hazmat classification.

Information is also maintained for the pods 20 and aircraft or vehicle 40. For a pod 20, the information can include but is not limited to: year manufactured; size (e.g., weight); flight ability when deployed from an aircraft or vehicle 40, autopilot capability to land through independent control or traveler 140 control; communication ability; flotation capability; on-board emergency equipment; and locator beacon information. For the aircraft or vehicle 40, the information can include but is not limited to: year manufactured; current location; and utility functions and specifications.

Figure 10:
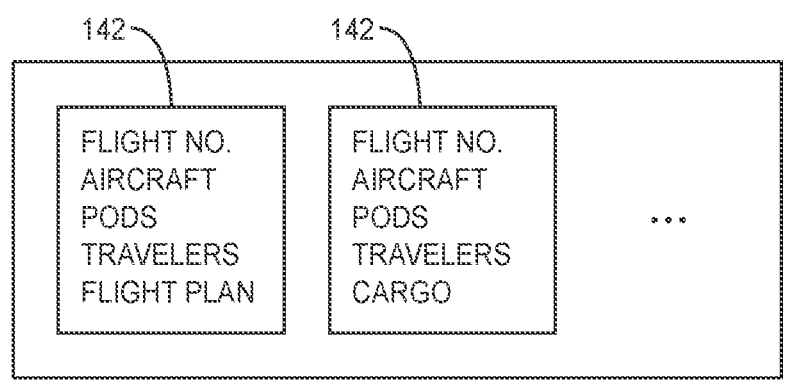
FIG. 10 is a schematic diagram of flight records that are stored at a database.

Prior to each flight, a flight record 142 is compiled and stored in the database 64. As illustrated in FIG. 10, the flight record 142 can include a flight number, departing and destination airports, aircraft or vehicle 40, number of pods 20, travelers 140 in each pod 20, and cargo containers 141 in each pod 20. The specific information previously entered for each traveler 140 and for the cargo containers 141 can be included in the flight record 142, or referenced in a manner to be accessible during the occurrence of an event. The different flight records 142 can include the same or different information.

Figure 11:
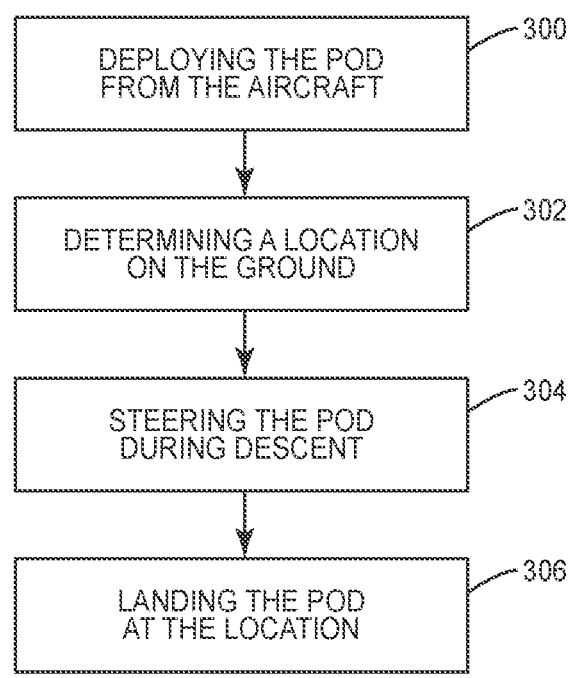
FIG. 11 is a flowchart diagram of a method of controlling a pod that is deployed from an aircraft or vehicle.

The pods 20 are configured to safely return to the ground/water during an event with the aircraft or vehicle 40. FIG. 11 illustrates an overview of a method of safely reaching the ground/water. The method includes deploying the pod 20 from the aircraft or vehicle 40 during a flight (block 300). A location on the ground is determined for the pod 20 to safely land (block 302). During the descent, the pod 20 is controlled to reach of the landing location (block 304) and to safely land at the location (block 306). These various steps can be performed in the order stated in FIG. 11, or in various orders depending upon the circumstances. Further, the method can provide for deployment, descent, and landing or one or more pods 20 from the aircraft or vehicle 40.

The pods 20 are deployed from the aircraft or vehicle 40 upon the occurrence of an event. The event causes an issue with the aircraft or vehicle 40 in which the pod 20 has a better chance of safely landing by deploying from the aircraft or vehicle 40 than to remain connected to the aircraft or vehicle 40. A variety of different events can cause deployment, such as but not limited to a mechanical issue with the aircraft or vehicle 40, weather-related issues that affects the aircraft or vehicle 40, and an issue with one or more passengers traveling in the aircraft or vehicle 40.

The pods 20 can also be deployed to reach a destination that is not accessible by the aircraft or vehicle 40. For example, the pods 20 can be deployed in a remote area that does not include a landing strip for the aircraft or vehicle 40, or in an ocean in which landing is not possible. In this situation, the event is the desire to get the pod 20 on the ground/water despite the continued effective operation of the aircraft or vehicle 40.

The deployment of the pods 20 from the aircraft or vehicle 40 can occur prior to the occurrence of an event. For example, an aircraft or vehicle 40 that is out of fuel can deploy the pods 20 prior to the engines 44 stopping, or deployment can occur prior to the aircraft or vehicle 40 flying over the inaccessible landing area. Deployment can also occur after the occurrence of the event. For example, the pods 20 are deployed after one or more engines 44 stop operating or after the aircraft or vehicle 40 has lost a predetermined amount of altitude within a predetermined period of time (and while not in a descent pattern).

The deployment can occur through a command that is entered by a pilot or other control person on the aircraft or vehicle 40. For example, the pilot of the aircraft or vehicle 40 enters a command into the aircraft or vehicle control unit 120 that causes deployment. The deployment can also occur through a command entered by a traveler 140 in a pod 20. The traveler 140 can input the command through an input device 55 in the control unit 50. The deployment can also automatically occur due to one or more sensor readings from sensors 129 in the aircraft or vehicle 40 or sensors 57 in the pod 20. In one example, the control circuit 121 of the aircraft or vehicle 40 or the control circuit 51 of the pod 20 automatically deploys the pods 20 upon the occurrence of a predetermined condition with the aircraft or vehicle 40. For example, in the event a sensor 129 detects a temperature above a predetermined amount within a cargo area of the fuselage 41 (indicating a fire on the aircraft or vehicle), or sensors 129 detecting that the engines 44 have stopped operating. These predetermined conditions can also occur when an event with the aircraft or vehicle 40 is imminent and provide time for the pods 20 to deploy prior to the actual event which could prevent deployment.

Figure 12:
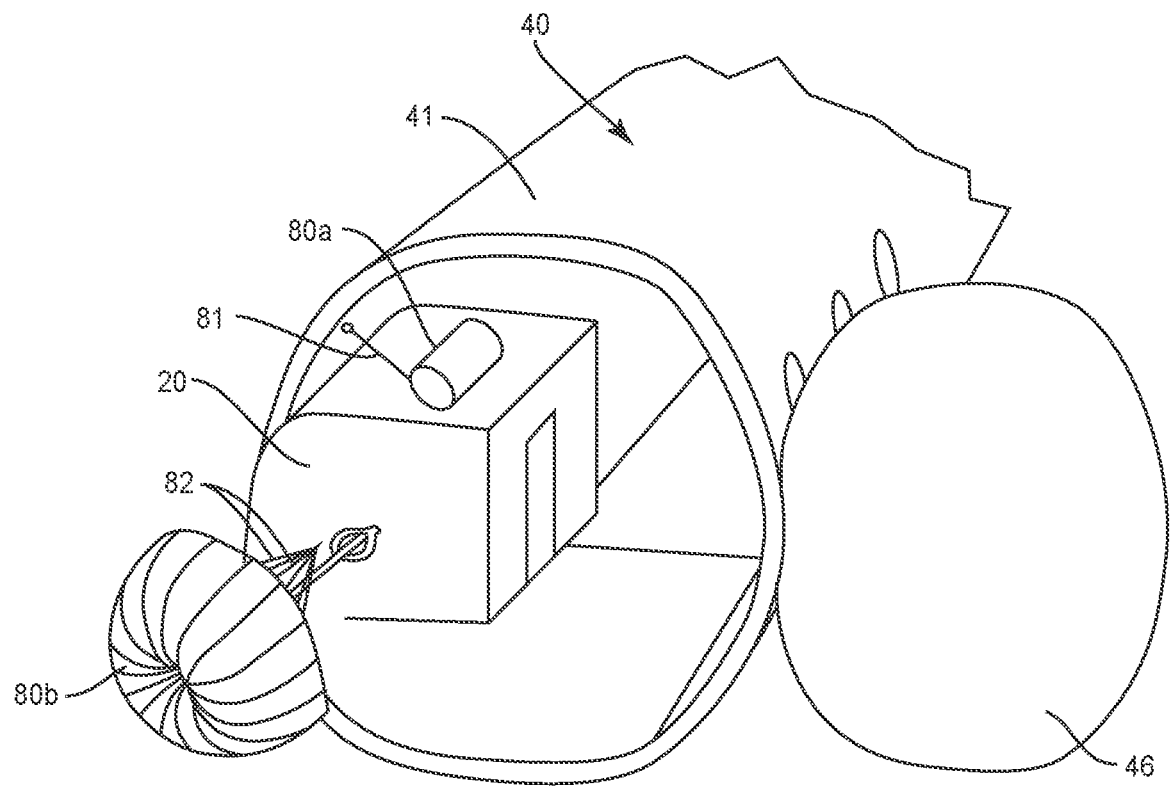
FIG. 12 is a perspective view of a pod positioned at an opening of an aircraft or vehicle.

One or more openings in the fuselage 41 allow for deployment of the pods 20. In one example, one or more of the doors 46 used for loading and unloading the pods 20 are used to deploy the pods 20. FIG. 12 illustrates a door 46 that is opened in the rear of the fuselage 41. The door 46 can remain attached to the aircraft or vehicle 40, or can be detached after opening. In another example, one or more explosive charges are positioned on the aircraft or vehicle 40. The deployment command causes the one or more explosive charges to detonate and form one or more openings in the aircraft or vehicle 40 to allow for deployment of the pods 20. In one example, the openings are formed in areas away from the doors 46.

The pods 20 are equipped with one or more canopies 80 that provide for the controlled descent from the pod 20 after deployment. When not in use, the canopies 80 are stowed and have a relatively small size to provide for positioning within the aircraft or vehicle 40. FIG. 12 illustrates a pod 20 with a stowed canopy 80a.

The canopies 80 can deploy at various times relative to the pod 20 exiting the aircraft or vehicle 40. The canopies 80 can deploy after the pod 20 has exited the aircraft or vehicle 40. In one example, a release cord 81 is attached to the canopy 80 and to the aircraft or vehicle 40. Deployment of the pod 20 from the aircraft or vehicle 40 causes the release cord 81 to deploy the canopy 80. The length of the release cord 81 provides for the canopy 80 to deploy after the pod 20 has exited. In another example, the pod 20 and/or canopy 80 is equipped with an altimeter 57 that causes the canopy 80 to deploy upon a drop in altitude above a predetermined rate (which is much greater than a descent during a regular landing of the aircraft or vehicle 40). In another example as illustrated in FIG. 12, canopy 80b is configured to open while the pod 20 is still within the aircraft or vehicle 40. The opening of the canopy 80b causes air to fill the canopy 80 and provide a force that pulls the pod 20 out of the aircraft or vehicle 40. In one example, a release cord 81 on the canopy 80 is attached to the aircraft or vehicle 40 and opens the canopy 80 when the pod 20 approaches the opening out of the aircraft or vehicle 40.

Figure 13:
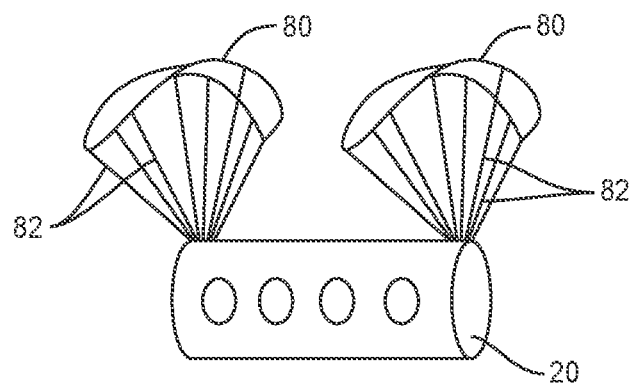
FIG. 13 is a perspective schematic view of pod with a pair of canopies in deployed orientations.

The pods 20 are equipped with one or more canopies 80. The number and sizes of the canopies 80 can vary depending upon various factors, such as the size of the pod 20, weight of the pod 20, and weight of the travelers 140 and/or cargo containers 141. Examples of canopies 80 include parasails and parachutes. FIG. 13 includes a pod 20 with a pair of parasail canopies 80 that are each steerable through manipulation of one or more of the lines 82.

Figure 14:
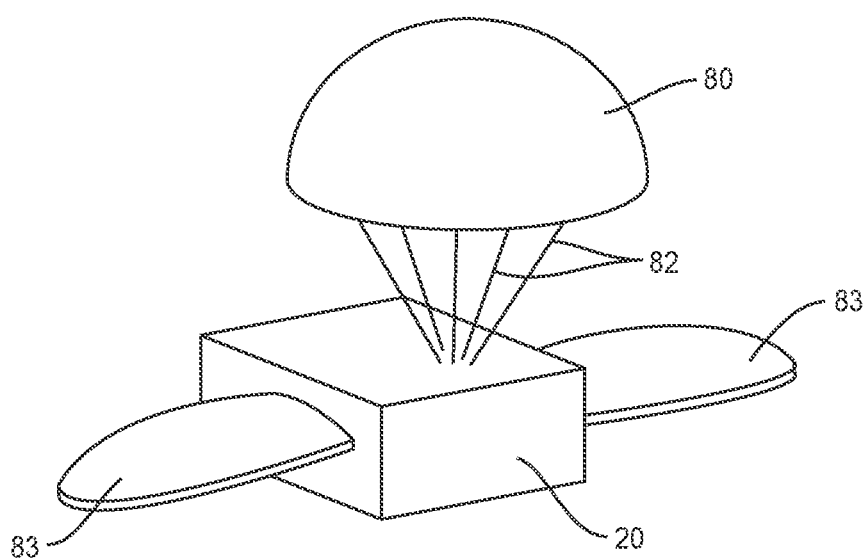
FIG. 14 is a perspective schematic view of a pod with a pair of wings and a deployed canopy.

Pods 20 can also be equipped with wings 83 as illustrated in FIG. 14. The wings 83 can be folded into a closed orientation when the pod 20 is in the aircraft or vehicle 40. Upon deployment of the pod 20, the wings 83 can extend outward. The wings 83 can assist in controlling the pod 20 during descent, and can be used to increase the glide path of the pod 20. The wings 83 can be used in combination with one or more canopies 80 as illustrated in FIG. 14. In another example, the wings 83 are used without canopies 80.

Figure 15:
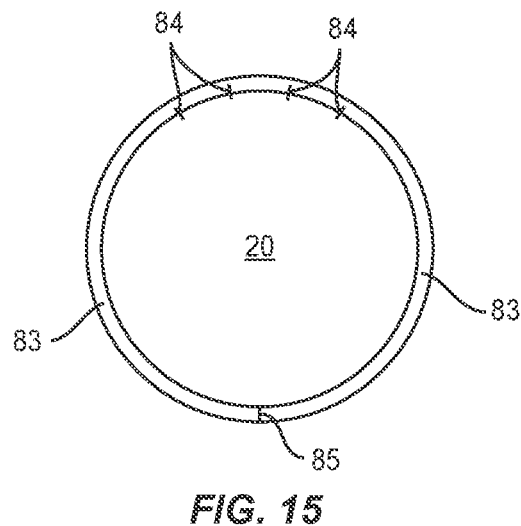
FIG. 15 is a schematic diagram of a pod with wings attached on the exterior.
Figure 15A:
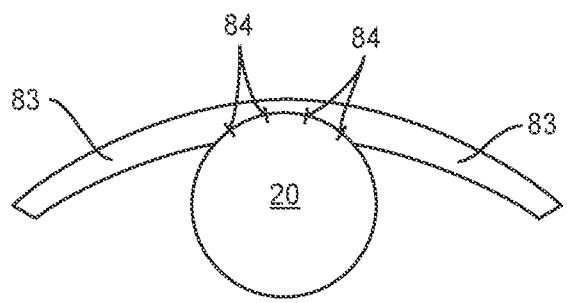
FIG. 15A is a schematic diagram of the pod of FIG. 15 with the wings in a deployed orientation.

FIG. 15 illustrates the wings 83 in a stowed orientation that wrap around the exterior of the pod 20. The wings 83 can extend around the entirety as illustrated in FIG. 15, or around one or more limited sections of the pod 20. When the pod 20 is deployed, the wings 43 can be extended as illustrated in FIG. 15A. A seam 85 in the wings 83 can separate providing for the wings 83 to unfold on opposing sides of the pod 20 to the extended position. One or more fasteners 84 can maintain the wings 83 attached to the pod 20.

Figure 15B:
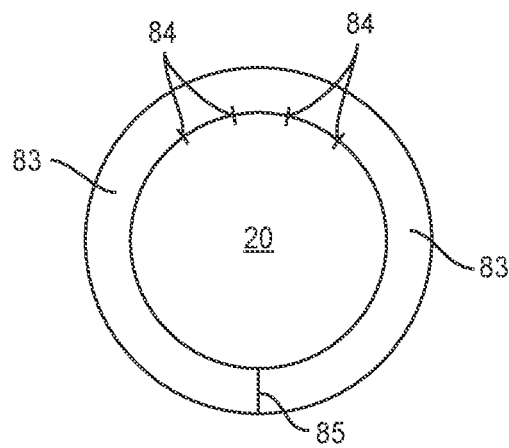
FIG. 15B is a schematic diagram of the pod of FIG. 15 with the wings inflated to act as an airbag for the pod.

The wings 83 can also function as an airbag to protect the travelers 140 and/or cargo containers 141 within the interior space 22. The wings 83 can be used as an airbag during occasions in which the pods 20 remain in the aircraft or vehicle 40. Examples include but are not limited to turbulence caused by weather, or an expected rough landing of the aircraft or vehicle 40. As illustrated in FIG. 15B, the wings 83 are inflated to form the airbag around the pod 20. The wings 83 can be equipped with one or more canisters of compressed gas to inflate the wings 83. In another example, a pump is activated to inflate the wings 83.

Figure 16:
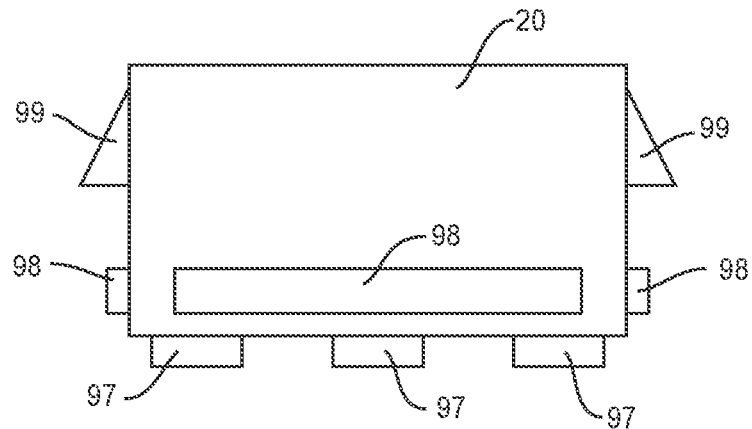
FIG. 16 is a schematic diagram of a pod with air bags, flaps, and flotation devices.

The pods 20 are equipped to safely land after their descent. As illustrated in FIG. 16, the pods 20 can include one or more airbags 97. The airbags 97 can be mounted to the exterior of the pods 20 and deployed prior to the landing. The airbags 97 can be in a stowed orientation while the pods 20 are in the aircraft or vehicle 40 to minimize the amount of occupied space. The activation can occur by various manners and at various times. In one example, the airbags 97 are activated when the pod 20 is deployed from the aircraft or vehicle 40. In another example, the airbags 97 are deployed based on an input from one or more sensors 57 (e.g., a change in altitude above a predetermined rate). The activation of the airbags 97 can require a combination of a received pod deploy command and a sensor reading.

The activated airbags 97 can facilitate the descent of the pod 20 from the aircraft or vehicle 40. The airbags 97 can include an enlarged surface area that acts to slow the descent of the pod 20 and increase the glide path of the pod 20.

In another example, the airbags 97 can be mounted in the interior space 22 to protect the travelers and/or cargo. The airbags 97 can activate upon contact with the ground during the landing similar to a traditional airbag within a car.

One or more flotation devices 98 can be attached to the pod 20. The flotation devices 98 are configured to float the pod 20 during a water landing. The flotation devices 98 can also maintain the orientation of the pod 20 in the water, such as to keep a top of pod 20 above the water. The flotation devices 98 can be in a stowed orientation when the pod 20 is within the aircraft or vehicle 40. Deployment can occur in various situations, including but not limited to when the pod 20 contacts the water, when the pod 20 reaches a predetermined altitude during descent, and when the control unit 50 in the pod 20 receives a signal from a sensor 57 that the pod 20 has landed in water.

The pod 20 can be controlled in various manners during descent. The control can occur through manipulating one or more of the lines 82 that lead to the one or more canopies 80. The cords 82 can be attached to one or more sides of the canopy 80. Manipulating the one or more cords 82 adjusts the orientation of the canopy 80 and thus the descent direction. One or more flaps 99 can be positioned on the exterior of the pod 20 as illustrated in FIG. 16. The flaps 99 can be adjusted to further control the descent.

Control can also be accomplished by deploying one or more additional canopies 80 during the descent. The additional canopies 80 can be attached to different sections of the pod 20 thus causing changes in the glide path. The additional canopies 80 can also be deployed in the event the pod 20 is descending at a rate greater than a predetermined amount, or is drifting away from the intended landing location. A sensor 57, such as an altimeter, can detect the high rate of descent and cause deployment of the one or more additional canopies 80. In another example, a traveler 140 in the interior space 22 can deploy the one or more additional canopies 80.

The pod 20 can be controlled during the descent from within the interior space 22 of pod 20. One or more control devices 31 can be positioned in the interior space 22 for a traveler 140 to control the descent by adjusting the various aspects described above. The control devices 31 can include various devices, such as but not limited to joysticks, keypads, and track balls. Windows 25 can be positioned adjacent to the control devices 31 to create a control position for the traveler 140 that is controlling the pod 20. One or more recording devices 58, such as cameras, can record a view of the descent from the exterior of the pod 20. The video can be displayed on the display 56 to further facilitate the steering by the traveler 140. In one example, control instructions are stored in the memory circuit 52. Upon deployment of the pod 20, the control instructions are displayed on the display 56 to facilitate the traveler in controlling the pod 20 during the descent. In one example, the pods 20 can be outfitted with a standard commercial Instrument Landing System (ILS). The ILS enables the traveler 140 controlling the pod 20 to conduct an instrument approach to landing if unable to establish a visual contact with the landing location. The ILS provides horizontal and vertical guidance during the landing process, and can also indicate the distance to a landing location.

In one example, the control circuit 51 acts as an on-board flight computer and feeds data to one or more motors attached to the one or more canopies 80. This data results in the motors adjusting pitch, yaw, and roll to control navigation.

The pod 20 can also be controlled by the server 60 through commands that are transmitted to the control unit 50. In one example, the server 60 automatically controls the pod 20 after receiving a deployment command from the pod 20 and/or aircraft or vehicle 40. The automatic steering by the server 60 can provide for situations in which none of the travelers 140 have been trained on how to control the pod 20. In another example, a traveler 140 can initially control the pod 20 with the server 60 monitoring the descent. If a situation is detected, such as moving away from an expected landing position or a descent that is too fast (i.e., greater than a predetermined rate of descent), the server 60 can take over and control the steering.

Figure 17:
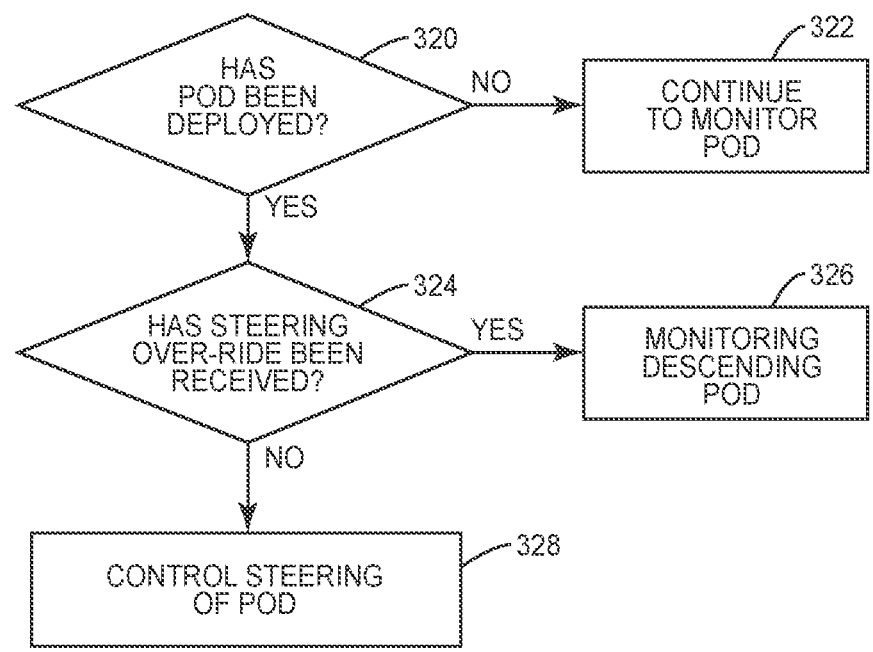
FIG. 17 is a flowchart diagram of a method of determining steering of the pod that is descending from an aircraft or vehicle.

FIG. 17 illustrates one method of the server 60 monitoring the deployment of the pod 20. The server 60 receives an indication that the pod 20 has been deployed from the aircraft or vehicle 40 (block 320). This signal can be received from the pod 20 and/or from the aircraft or vehicle 40. In another example, the indication of deployment is received from another source, such as an air traffic controller 66 that is monitoring the flight. If no deployment has occurred, the server 60 continues to monitor the pod 20 (block 322).

Upon initial deployment, a traveler 140 is able to steer the pod 20 during descent. This can include the traveler 140 inputting an over-ride to allow them to control the pod 20. For example, upon deployment a prompt is displayed on the display 56 instructing the traveler 140 whether the pod 20 should be steered by a traveler 140 or automatically by the server 60. The traveler 140 has a predetermined period of time in which to signal the server 60 that they will be steering the pod 20. If a steering over-ride is received (block 324), the traveler 140 is able to control the steering and the server 60 monitors the descent (block 326). If no over-ride is received, the server 60 takes control of the steering of the pod 20 during the descent (block 328).

The server 60 determines one or more landing locations for the pod 20. The one or more landing locations can be determined prior to the deployment of the pod 20 from the aircraft or vehicle 40, or after the deployment of the pod 20 from the aircraft or vehicle 40. The landing locations include areas that minimize risk to the travelers 140 and/or cargo containers 141 and optimizes the ability for emergency personnel to reach the pod 20 and provide care.

Figure 18:
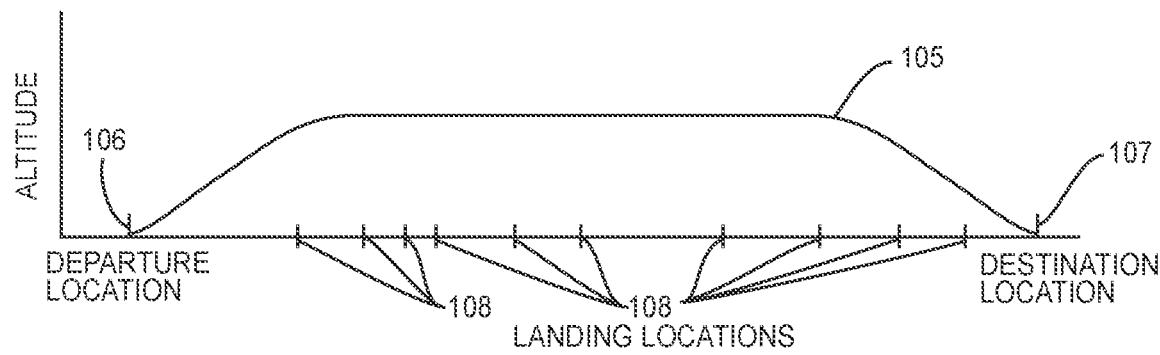
FIG. 18 is a diagram of a flight path with landing locations.

In one example, a flight path 105 with landing locations 108 for the flight is stored at the server 60 prior to the flight. As illustrated in FIG. 18, the flight path 105 includes the departure location 106 and destination location 107. The flight path 105 also includes one or more pre-determined landing locations 108. In the event of a deployment of the pod 20 from the aircraft or vehicle 40, the server 60 determines the one or more landing locations 108 based on the deployment location along the flight path 105.

During the flight, the server 60 monitors the location of the aircraft or vehicle 40 and pods 20. Monitoring can occur through signals received from the control units 50 in the pods 20 and/or from the aircraft or vehicle control unit 120. In another example, the server 60 receives the deployment location from another source through the wireless communication network 70, such as an air traffic controller 66 that is monitoring the flight. When a pod 20 deployment occurs, the server 60 references the flight path 105 and the one or more landing locations 108 in the proximity of the deployment location. The one or more landing locations 108 can be transmitted to the pods 20.

Figure 19:
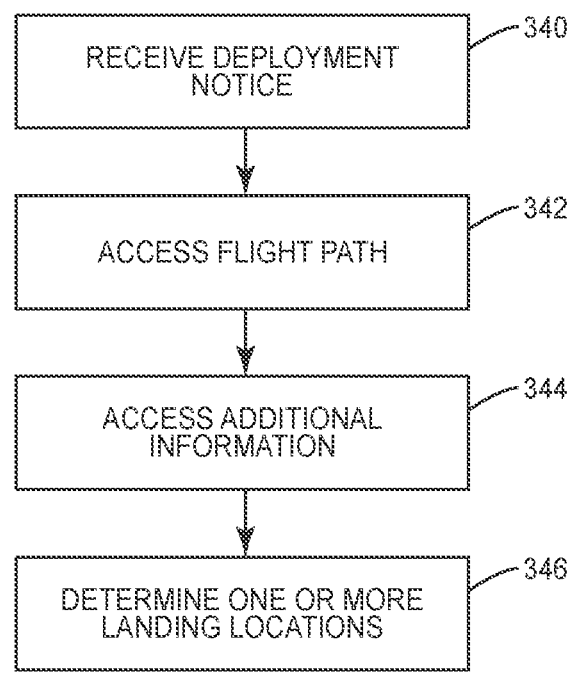
FIG. 19 is a flowchart diagram of a method of determining one or more landing locations.

FIG. 19 illustrates another method in which the one or more landing locations are determined after the deployment of the pod 20 from the aircraft or vehicle 40. The server 60 receives a deployment notice indicating that the pod 20 has deployed from the aircraft or vehicle 40 (block 340). After receiving the notice, the server 60 accesses the flight path 105 (block 342). The server 60 also accesses additional information to use in combination with the flight path 105 to determine the one or more landing locations (block 344). The additional information can include but is not limited to information from the aircraft or vehicle 40 such as location of deployment, altitude at deployment, and aircraft or vehicle velocity at deployment. Additional information can also be obtained through the network 70, such as but not limited to weather information from a weather source 67. The weather source 67 can provide wind speed, precipitation, and various other weather issues that could affect the glide path of the pod 20. The server 60 uses the flight path 105 in combination with the additional information to determine the one or more landing locations (block 346). For example, the flight path 105 can include three landing locations within proximity to the deployment. However, the weather information indicates a strong wind. Therefore, one or more of the landing locations may not be accessible due to the wind. Alternatively, the strong wind may result in one of more additional landing locations being an option due to the increased glide path in a downwind direction.

Figure 20:
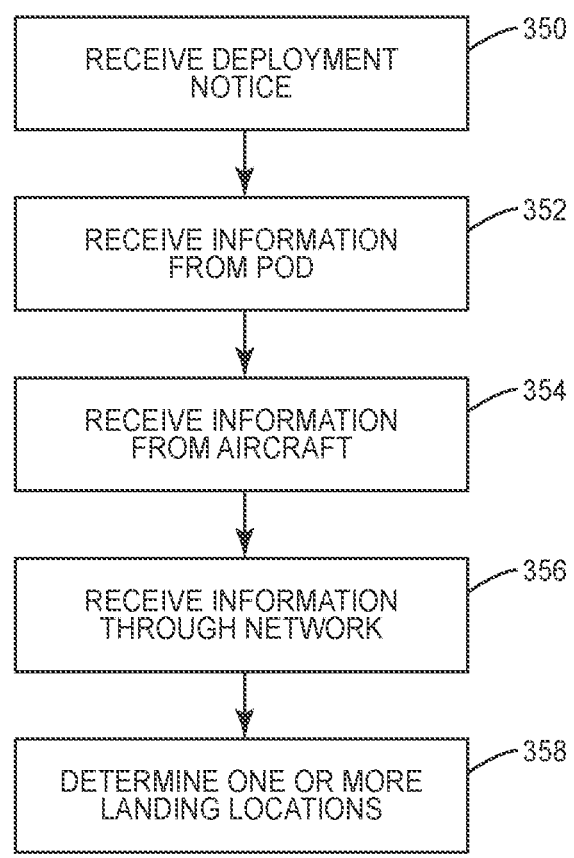
FIG. 20 is a flowchart diagram of a method of determining one or more landing locations.

In another example, the one or more landing locations are determined after receiving the deployment notice. FIG. 20 includes one method of determining one or more landing locations that includes receiving the deployment notice (block 350). After receiving the notice, the server 60 obtains information from the pod 20 (block 352) and the aircraft or vehicle (354). The server 60 can request the information upon receiving the deployment notice, or one or both of the pod 20 and aircraft or vehicle 40 can transmit the information automatically. The server 60 can also receive information from one or more sources through the network 70 (block 356). The various data can include but is not limited to deployment location, altitude at deployment, and velocity at deployment, wind speed, wind direction, precipitation, and geography and roads in proximity to the deployment location. The server 60 can determine one or more landing locations based on this information (block 358).

The number of landing locations can vary. In one example, a single landing location is determined. In other examples, two or more landing locations are determined. With multiple landing locations, the pod 20 can be steered towards a first one of the landing locations. This primary landing location can be determined based on various factors, such as but not limited to the one closest to the deployment position, provides for the safest landing opportunity, and provides for access to roads to enable rescue. If the pod 20 is unable to reach the primary landing location, a second landing location can be selected.

In another example, the one or more landing locations are determined by the control unit 50 within the pod 20. The flight path 105 of the aircraft or vehicle 40 can be stored in the memory circuit 52 prior to the flight. At deployment, the control unit 50 determines the one or more landing locations based on the flight path 105. The control unit 50 can also use additional information based on readings from sensors 57 on the pod 20 and/or sensors 129 on the aircraft or vehicle 40 to determine the one or more landing locations. The control unit 50 can also access one or more sources through the communication network 70 to obtain additional information to determine the one or more landing locations.

In situations in which multiple pods 20 are deployed from an aircraft or vehicle 40, the one or more landing locations can be the same for each of the pods 20. Landing each of the pods 20 at the same location can facilitate rescue operations as emergency personnel and services can be concentrated in a single area. Additionally, travelers from the different pods 20 can assist each other once on the ground. In another example, different pods 20 include different landing locations. This can be due to various reasons, including but not limited to different descent characteristics of the different pods 20, different physical attributes of the different pods 20 (e.g., weight, shape), and different deployment locations for the different pods 20 due to different deployment times.

The pods 20 can be equipped with flares to signal emergency personnel. The flares can be configured to operate during descent and/or after the pods 20 have reached the ground/water. After landing, the control unit 50 through the communication circuit 53 can periodically transmit information about the pod 20 and/or travelers. Examples of data include but are not limited to a distress signal indicating the need for help, the present location of the pod, and the medical condition of the travelers.

Figure 21:
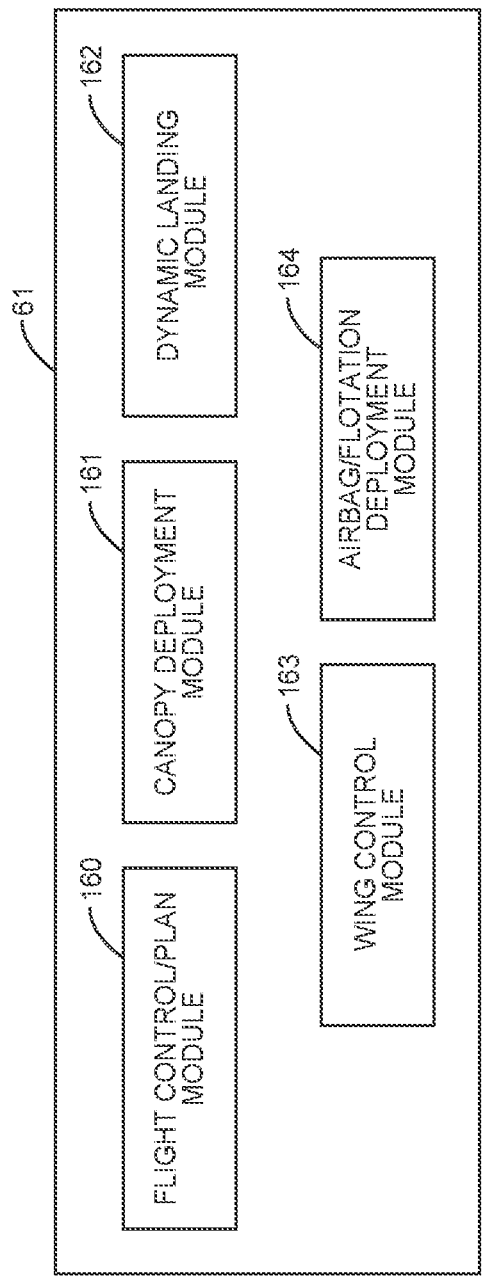
FIG. 21 is a schematic diagram of modules within a processing circuit of a server.

FIG. 21 illustrates functional modules of the processing circuit 61 of the server 60. The flight control/plan module 160 can determine glide paths and landing plans for the pod 20. In one example, the module 160 receives environmental conditions from one or more of the pod 20, aircraft or vehicle 40, and network sources. The module 160 is able to signal one or more other modules (e.g., wing control module 163) to operate in accordance with the flight plan. The module 160 can also control steering of the pod 20. The module 160 can also transmit information to emergency responders, such as the one or more landing locations, pod configuration. The module 160 can also receive information from the responders to further update the flight control plans. In another example, the modules 160-164 are program instructions that are stored in the memory circuit 62 and configured to be run by the processing circuit 61 to perform the desired functions.

A canopy deployment module controls deployment of the one or more canopies 80. A wing control module 163 controls deploy of the wings 83. Airbag/flotation device deployment module 164 controls deployment of the one or more airbags 97 and flotation devices 98. A dynamic landing module 162 controls landing of the pod 20 at the landing zone.

The various pods 20 can include one or more of these modules 160-164.

In one example, the pod 20 is configured to periodically transmit location information after landing on the ground/water. The transmissions can include various information about the pod 20, travelers 140, and cargo containers 141. The transmission can also include an emergency locator beacon to assist emergency personnel in locating the pod 20.

The present invention may be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of operating a pod that is attached to an aircraft or vehicle, the method comprising:
    during flight of the aircraft or vehicle, deploying the pod from the aircraft or vehicle while at an elevation above ground, the pod comprising walls that extend around and form a contained interior space that houses one or more travelers or cargo containers;
    determining a landing location for the pod to safely land;
    after deployment, prompting the one or more travelers how the pod is to be steered;
    while the pod is descending from the elevation and in response to the prompting, controlling the pod from a computing device that is remotely located with the computing device steering the pod towards the landing location; and
    landing the pod at the landing location.

2. The method of claim 1, further comprising determining a condition of the one or more of the travelers that are in the pod after the pod deploys from the aircraft or vehicle based on signals received from personal electronic devices that are on the one or more travelers or cargo containers.

3. The method of claim 1, further comprising sensing a condition of the one or more travelers or cargo containers after deploying the pod from the aircraft or vehicle based on a motion sensor located within the interior space.

4. The method of claim 1, further comprising removing one or more sections of the aircraft or vehicle prior to deploying the pod from the aircraft or vehicle to prevent damage to the pod.

5. The method of claim 1, further comprising determining the landing location after deploying the pod from the aircraft or vehicle and while descending towards the landing location.

6. The method of claim 1, wherein determining the landing location comprises calculating a glide path of the pod and selecting the landing location from a plurality of landing options within the glide path.

7. The method of claim 1, further comprising continuously monitoring a geographic location of the pod during the flight.

8. The method of claim 1, wherein landing the pod at the landing location comprises deploying airbags that are mounted on the pod and that inflate on an exterior of the pod during the descent and prior to landing the pod at the landing location.

9. The method of claim 1, further comprising, after landing at the landing location, transmitting from the pod a geographic location of the pod, an orientation of the pod, and a physical condition of the pod.

10. The method of claim 1, further comprising while descending receiving commands from a traveler that is within an interior of the pod that the pod should be steered remotely and in response controlling the pod from the computing device that is remotely located.

11. The method of claim 1, further comprising receiving a signal from an outside source away from the pod and the aircraft that the pod has deployed and then controlling the pod from the computing device that is remotely located.

12. The method of claim 1, further comprising after deploying the pod displaying a prompt on a display within the interior space and in response receiving an input from a traveler within an interior regarding control and in response to the input controlling the pod from the computing device that is remotely located.

13. The method of claim 1, further comprising receiving no response to the prompting and controlling the pod from the computing device.

14. A method of operating a pod that is attached to an aircraft or vehicle, the method comprising:

determining an occurrence of an event with the aircraft or vehicle during flight and while the aircraft or vehicle is at an elevation and while the pod is being carried by the aircraft or vehicle, the pod comprising a contained interior space that houses one or more travelers;

deploying the pod from the aircraft or vehicle during the flight and after the occurrence of the event;

after deployment, displaying a prompt on a display within the interior space on how to steer the pod;

determining that there is not a steering over-ride in response to the prompt and steering the pod from a remote location;

calculating a plurality of landing locations that are located within a predetermined range of the event; and landing the pod at the one landing location while the pod is deployed from the aircraft.

15. The method of claim 14, further comprising calculating a glide path of the pod and calculating the plurality of landing locations that are located within the glide path.

16. The method of claim 14, further comprising receiving at least one of the elevation and speed of the aircraft or vehicle from the aircraft or vehicle prior to deploying the pod from the aircraft or vehicle and calculating a glide path of the pod based on at least one of the elevation and the speed.

17. The method of claim 14, further comprising sensing conditions within the interior space after landing the pod at the one landing location and determining a condition of the one or more travelers or cargo containers based on the conditions.

18. The method of claim 14, further comprising receiving an indication from a remote node that the pod has been deployed from the aircraft.

19. The method of claim 14, further comprising the initial period ending upon detecting that the pod is descending at rate that is greater than a predetermined level.

20. The method of claim 14, further comprising displaying on the display within the pod that the pod is being steered from the remote location.

* * * * *